United States Patent [19]

Scruggs

[11] Patent Number: 5,782,518
[45] Date of Patent: Jul. 21, 1998

[54] TOOL HANDLE

[76] Inventor: Lincoln Scruggs. 7369 Farrand. Clio, Mich. 48420

[21] Appl. No.: 617,386

[22] Filed: Mar. 18, 1996

[51] Int. Cl.[6] .................................................. B25G 1/10
[52] U.S. Cl. .................. 294/57; 15/143.1; 16/110 R; 294/54.5
[58] Field of Search .................. 294/49, 50.8, 51, 294/53.5, 54.5, 57, 58; 15/143.1, 145; 16/110 R, 111 R, 111 A, 112, 114 R; 37/241, 265, 278, 284, 285, 434, 467; 56/400.01, 400.04

[56] References Cited

U.S. PATENT DOCUMENTS

| | | |
|---|---|---|
| 389,092 | 9/1888 | Mercer . |
| 1,207,472 | 12/1916 | Barton .................................. 294/54.5 |
| 2,629,624 | 2/1953 | Nelles .................................. 294/57 |
| 3,023,021 | 2/1962 | Fricke et al. . |
| 3,024,547 | 3/1962 | Harrison . |
| 3,078,604 | 2/1963 | Neuman . |
| 3,136,574 | 6/1964 | Pasquale .................................. 294/54.5 |
| 3,222,699 | 12/1965 | Zeisig .................................. 7/14.55 |
| 4,042,270 | 8/1977 | Weiland .................................. 294/50.8 |
| 4,125,951 | 11/1978 | Huerth . |
| 4,477,972 | 10/1984 | Testa .................................. 294/58 X |
| 4,531,713 | 7/1985 | Balboni .................................. 254/131.5 |
| 4,690,447 | 9/1987 | Adams .................................. 294/57 |
| 4,704,758 | 11/1987 | Hoffman .................................. 294/57 X |
| 4,865,373 | 9/1989 | Hudson .................................. 294/54.5 |
| 5,048,883 | 9/1991 | Waluk .................................. 294/54.005 |
| 5,060,343 | 10/1991 | Nisenbaum .................................. 16/111 |
| 5,159,769 | 11/1992 | Odorisio .................................. 294/54.5 X |
| 5,197,772 | 3/1993 | Stecyk .................................. 294/57 |

FOREIGN PATENT DOCUMENTS

| | | | |
|---|---|---|---|
| 661334 | 7/1965 | Belgium .................................. | 294/57 |
| 1407731 | 6/1965 | France .................................. | 294/57 |

Primary Examiner—Johnny D. Cherry
Attorney, Agent, or Firm—John J. Swartz

[57] ABSTRACT

A tool handle for a tool including an upper hand-grip end, a lower tool mounting end, and a plurality of substantially straight handle portions serially coupled together between the upper and lower ends. Adjacent ones of the handle portions are obliquely inclined relative to each other and alternate ones of the handle portions lie in planes which are parallel to each other.

20 Claims, 2 Drawing Sheets

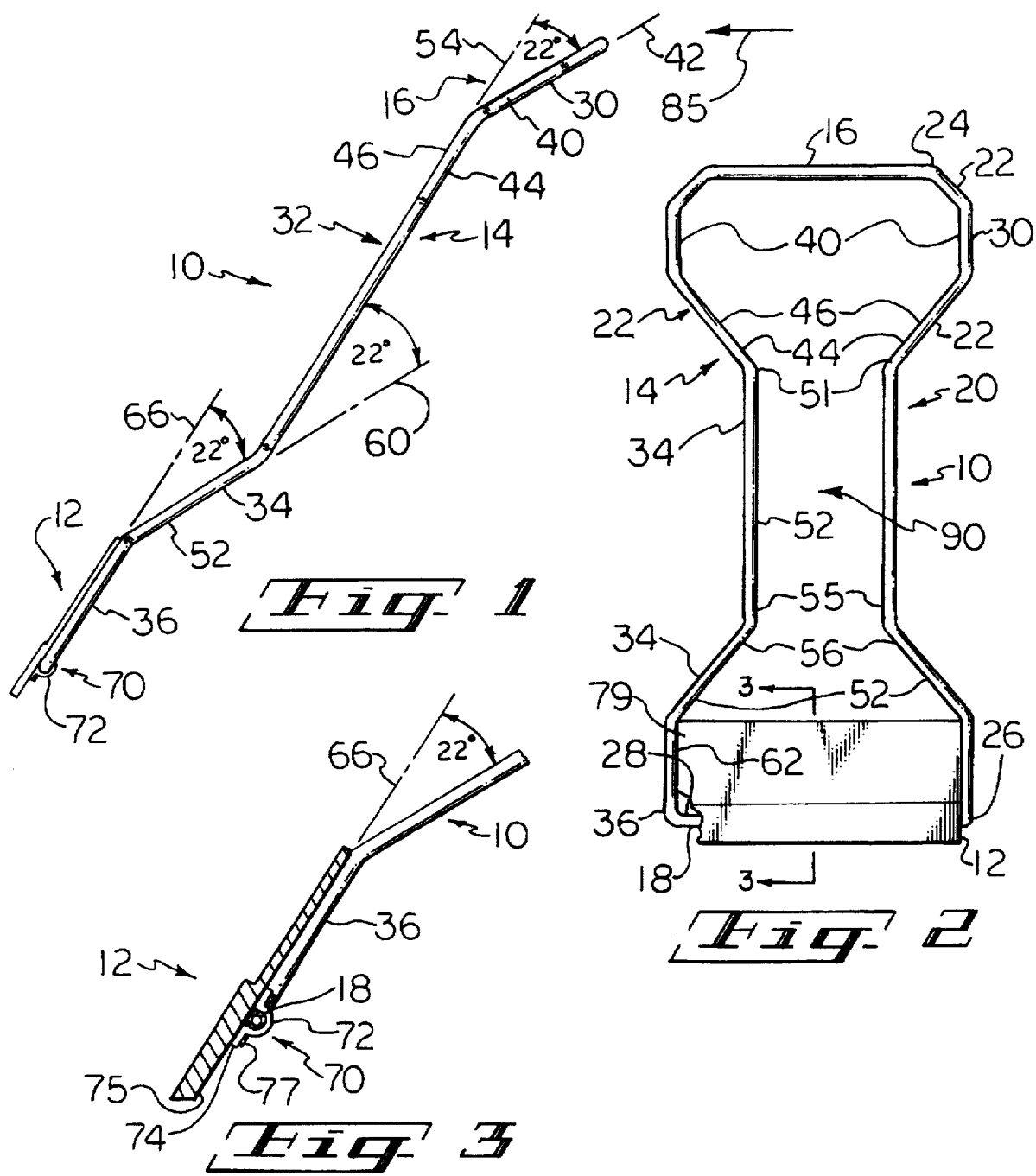

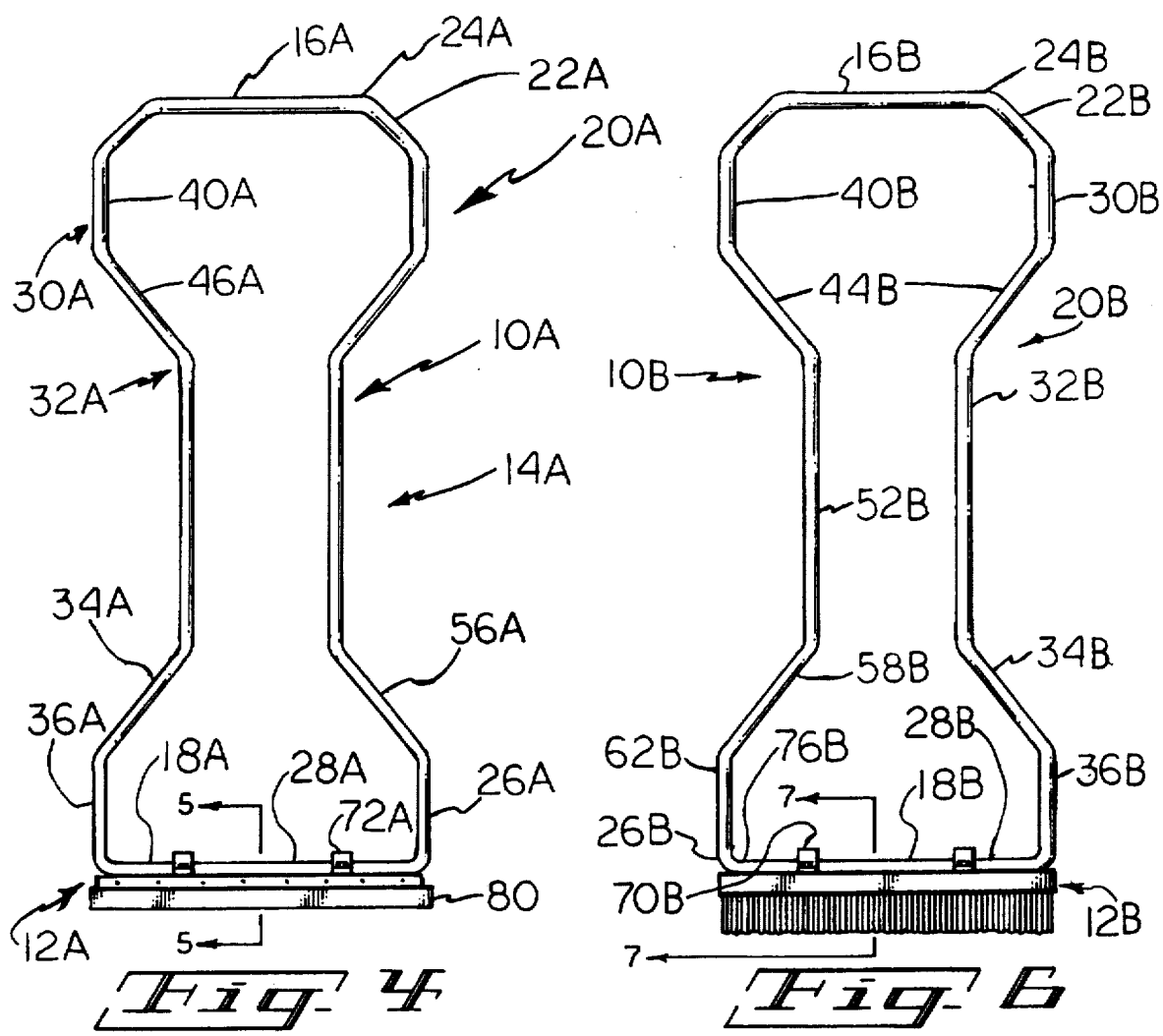
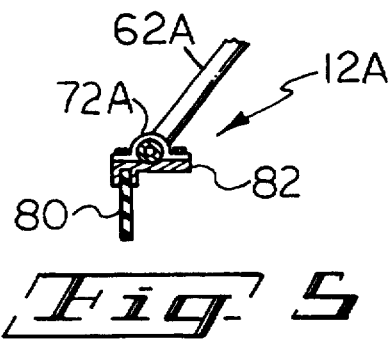
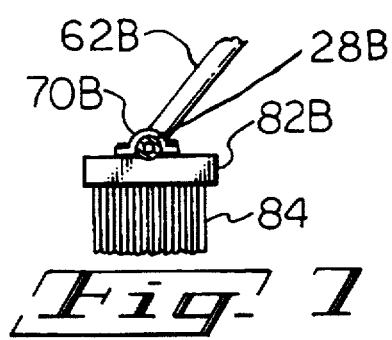

TOOL HANDLE

BACKGROUND OF THE INVENTION

1. Field of the Invention

This invention relations to a tool handle, and more particularly to a handle for a tool such as a shovel or the like.

2. Description of the Prior Art and Objects

Tools, such as hoes, rakes, shovels, brooms, squeegees, etc., have typically included a tool head mounted on an elongate handle member having a single hand grip. Such a tool handle is illustrated in U.S. Pat. No. 3,222,699 issued to L.L. Zeisig on Dec. 14, 1965. The ability to push and/or pull a tool with a straight, in-line style type handle is limited. Accordingly, it is an object of the present invention to provide a new and novel tool handle which will allow the user to use both hands to easily and equally apply force to the upper end of the tool handle.

Another object of the present invention is to provide a tool handle which will provide the user with increased control of a tool head coupled to the handle.

Tool heads, such as shovel blades, squeegees, and brooms are typically mounted on push-type handles which are utilized to push the tool head as opposed to being concerned about lifting the tool head. Other tools, such as the snow scraper illustrated in U.S. Pat. No. 389,092 issued to C.A. Mercer on Sept. 4, 1888, include a tool cantileverly mounted at the lower end of a pair of "in-line" members coupled to opposite ends of a handle. Such handles do not effectively transmit the force to the blade and require the user to exert substantial effort.

It has been found that a tool handle, having a plurality of serially coupled handle portions with adjacent ones of the handle portions being inclined relative to each other and alternate ones of the handle portions parallel to each other is ergonometrically superior. Accordingly, it is another object of the present invention to provide an ergonometrically superior tool handle.

It is another object of the present invention to provide a new and novel tool handle which will more efficiently transfer energy from a hand grip to a tool head and, thus, reduce the amount of work otherwise required.

It has been found advantageous to the performance of work by a work head to provide a handle which includes a plurality of generally straight handle portions serially coupled between the upper handle and the lower tool mounting end. It has also been found that, to most efficiently transmit forces to the tool head, adjacent ones of the handle portions should be inclined relative to each other and alternate ones of the tool handle portions should be disposed in planes which are parallel to each other. Accordingly, it is yet another object of the present invention to provide a tool handle having a hand grip at one end and a tool mounting lower end and a plurality of generally straight handle portions disposed therebetween with alternate ones of the handle portions lying in planes which are parallel to each other.

It is yet another object of the present invention to provide an ergonometrically designed tool handle having a plurality of serially coupled handle portions which lie in planes that are obliquely inclined to the planes of the adjacent handle portions but are parallel to alternate ones of the handle portions.

Yet another object of the present invention is to provide a tool mounting handle of the type described which includes a handle frame having an upper hand-grip bow, a pair of elongate side bows having upper ends coupled to the hand grip bow and lower ends for coupling to a tool, and intermediate portions between the upper and lower ends which are laterally inwardly bowed.

It is a still further object of the present invention to provide a new and novel tool handle which is strong, light weight, and which more efficiently transmits energy from the handle to the tool head and minimizes the work required to perform an operation with the tool head.

It is yet another object of the present invention to provide a new and novel biotechnologically improved tool handle which will make a work chore safer and easier.

It is another object of the present invention to provide a new and improved ergonometrically designed tool push-type handle for pushing a tool head.

Other objects and advantages of the present invention will become apparent to those of ordinary skill in the art as the description thereof proceeds.

SUMMARY OF THE INVENTION

A tool handle for attachment to a tool head, such as a shovel blade or the like, said tool handle comprising: an upper handle end, a lower tool end for mounting a tool head, at least four substantially straight handle portions serially coupled together between the upper and lower ends, adjacent ones of the handle portions lying in planes which are obliquely inclined relative to each other, and alternate ones of the handle portions lying in planes which are parallel to each other.

DESCRIPTION OF THE DRAWINGS

The invention may be more readily understood by referring to the accompanying drawings, in which:

FIG. 1 is a side elevational view of a tool including a tool handle constructed according to the present invention;

FIG. 2 is a front elevational view thereof, part of the tool blade being broken away to better illustrate the tool handle;

FIG. 3 is an enlarged, sectional side view, taken along the section line 3—3 of FIG. 2;

FIG. 4 is a front elevational view of a slightly modified tool;

FIG. 5 is an enlarged, sectional side view, taken along the line 5—5 of FIG. 4;

FIG. 6 is a front elevational view of a further slightly modified tool; and

FIG. 7 is a slightly enlarged, sectional side view, taken along the line 7—7 of FIG. 6.

DESCRIPTION OF PREFERRED EMBODIMENT

A tool handle, generally designated 10, constructed according to the present invention, is particularly adapted for use with a tool head, such as a shovel blade, generally designated 12. The shovel blade 12 comprises a thin sheet or plate of sheet metal, aluminum of hardened plastic.

The tool handle 10 includes a one-piece, hollow tubular frame member, generally designated 14, having an upper cross bow or hand-grip 16 for gripping by the hands of the user and a lower, tool mounting cross-bow 18. The handle 10, which could comprise a one piece aluminum tube and/or preferably, injection molded plastic, includes a pair of elongate side bows, generally designated 20, having upper ends 22 coupled to opposite ends 24 of the upper handgrip bow 16 and lower ends 26 integrally coupled to opposite ends 28 of the lower cross bow 18.

The elongate side bows 20 include at least four substantially straight handle portions 30, 32, 34 and 36 integrally serially coupled together as illustrated. The upper straight handle portions 30 comprise a pair of laterally spaced apart tubular sections 40 which lie in a plane 42 which intersects the axis or centerline of hand-bow 16.

The second lowermost handle portion 32 includes laterally inwardly bowed or inclined intermediate coupling portions, generally designated 44, having a pair of laterally spaced apart cylindrical or tubular sections 46, which are integral with the tubular sections 40, converging downwardly away from the upper handle portion 30.

The second handle portion 32 includes another pair of generally upstanding cylindrical sections 52 integrally coupled to the lower ends 51 of tubular sections 46. The tubular sections 46 and 52, lie in a plane 54 which is obliquely inclined, relative to the plane 42, at an angle of 22° as illustrated.

A third lowermost handle portion 34 includes a pair of laterally spaced apart cylindrical sections 56 which are coupled to the lower ends 55 of tubular section 52 and diverge downwardly outwardly away from the second handle portion 32. The section 34, including tubular sections 56, lie in a plane 60 which is obliquely inclined relative to the adjacent plane 54 at an angle of 220° and is parallel to the plane 42.

The lowermost handle portion 36 includes a pair of laterally spaced apart cylindrical sections 62 which are integral with the tubular sections 56 and the lower cross bar 18 and lie in a plane 66 which is inclined at an angle of 22° relative to the plane 60. As illustrated, the plane 66 is obliquely inclined relative to the adjacent plane 60 but is parallel to the plane 54 of the alternate section 32.

Apparatus, generally designated 70, is provided for mounting the shovel blade 12 on the tubular member 18 and includes a pair of laterally spaced apart semi-cylindrical clamps 72 which receive the tube 18 and includes a pair of offset mounting ears 74 coupled to the back side 75 of the blade 12 via a pair of bolts 77 threaded into threaded bores provided in the blade 12. If desired, additional screws or bolts may be utilized for securing the lateral edges 79 to the lowermost pair of cylindrical handle members 62.

ALTERNATE EMBODIMENT

Referring now to FIGS. 4 and 5, a slightly modified tool is illustrated and corresponding parts will be identified by corresponding reference characters followed by the letter A subscript. As opposed to the shovel blade 12, the tool head 12A illustrated in FIGS. 4 and 5 comprises a squeegee including a rubber blade 80 mounted on the underside of a horizontal plate 82 which is fixed to the tube 18A via a pair of clamp members 72A.

ALTERNATE EMBODIMENT

Referring now to FIGS. 6 and 7, another slightly modified tool is illustrated and corresponding parts will be referred to by corresponding reference characters followed by the letter B subscript.

The tool head 12B illustrated in FIGS. 6 and 7 comprises a broom having a plate 82B mounting a plurality of broom bristles 84 along the bottom side thereof. The plate 82B is coupled to lower tubular bar 18B via a set of semi-cylindrical clamp members 70B.

THE OPERATION

In operation, the user mounts one of the tool heads 12, 12A or 12B to the lower cross bar 18 via the semi-cylindrical clamps 72 and bolts 77. The user will grasp the handle bar 16 and push forwardly in the direction represented by the arrow 85. Force will be transmitted through the sections 30, 32, 34 and 36 to the work blade 12 to forwardly push snow, dirt or the like. The placement of alternate handle portions in parallel planes efficiently transmits force and allows the user to have equal balance and control via the use of two hands. The ergonometrically designed tool handle makes the chore safer and easier. The open frame work allows air, wind or the like, to pass through the opening 90 to the open frame work to minimize the effort required to forwardly push the shovel.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. An elongate tool handle for attachment to a tool head, such as a shovel blade, or the like, comprising:

a first, substantially straight handle portion lying in a first plane and including a hand grip;

a second, substantially straight, handle portion, integral with said first portion, lying in a second plane which obliquely intersects said first plane;

a third, substantially straight handle portion, integral with said second portion, lying in a third plane which obliquely intersects said second plane and is parallel to said first plane;

a fourth, substantially straight handle portion, integral with said third portion, lying in a fourth plane which obliquely intersects said third plane and is parallel to said second plane; and means for coupling said fourth handle portion to a tool head;

said fourth plane being parallel to said second plane.

2. The tool handle set forth in claim 1 wherein said handle comprises a one-piece cylindrical member.

3. The tool handle set forth in claim 1 wherein said first handle portion comprises a generally horizontal, cylindrical member having a first pair of cylindrical members depending from opposite ends of said generally horizontal cylindrical member.

4. The tool handle set forth in claim 3 wherein said second handle portion comprises a second pair of cylindrical members, integral with said first pair of cylindrical members; at least a section of said second pair of cylindrical members inwardly converging in a direction away from said first handle portion.

5. The tool handle set forth in claim 4 wherein said third handle portion comprises a third pair of cylindrical members integral with said second pair of cylindrical members; at least a section of said third pair of cylindrical members diverging outwardly in a direction away from said second handle portion.

6. The tool handle set forth in claim 5 wherein said fourth handle portion comprises a fourth pair of cylindrical members, integral with said third pair of cylindrical members and integrally coupled to a lower, generally horizontal cylindrical member.

7. The tool handle set forth in claim 6 wherein said means for coupling said fourth handle portion to a tool head includes means for detachably coupling said lower generally horizontal cylindrical member to a tool head.

8. The tool handle set forth in claim 7 wherein said first, second, third and fourth handle portions comprise a continuous, one-piece, hollow tubular member.

9. A tool handle for attachment to a tool head, such as a shovel blade or the like, said tool handle comprising:

a one-piece frame member having
an upper handle portion lying in a first plane and including
a generally horizontal hand grip portion and
an upper pair of laterally spaced apart side bow portions integrally depending from opposite ends of said hand grip portion;
a lower handle portion for coupling to a tool head lying in a second plane oblique to said first plane;
an intermediate handle portion including
an upper intermediate handle portion having a first pair of laterally spaced apart intermediate bow portions integrally coupled to said upper pair of side bow portions and downwardly inwardly converging toward each other;
a lower intermediate handle portion having a second pair of intermediate, laterally spaced apart bow portions integrally coupled to said first pair of intermediate bow portions and said lower handle portion;
said second pair of intermediate bow portions diverging downwardly outwardly; and
means for coupling said lower handle portion to a tool head;
said second pair of intermediate bow portions lying in a third plane oblique to said second plane and parallel to said first plane.

10. The tool handle set forth in claim 9 wherein said upper intermediate handle portion lies in a fourth plane parallel to said second plane.

11. The tool handle set forth in claim 10 wherein said lower handle portion comprises a transverse bow coupled to said second pair of intermediate bow portions.

12. The tool handle set forth in claim 11 wherein said means for coupling said lower handle portion to a tool head comprises means for detachably coupling said transverse bow to a tool head.

13. The tool handle set forth in claim 12 wherein said handle comprises a one piece tubular member.

14. A shovel comprising:

a shovel blade;
an elongated handle having an upper, handle end and a lower blade mounting end; and
means mounting said blade on said lower blade mounting end of said handle;
said handle comprising at least four substantially straight handle portions serially coupled together between said upper and lower ends;
adjacent ones of said handle portions being obliquely inclined relative to each other; and
alternate ones of said handle portions lying in planes which are parallel to each other.

15. The shovel set forth in claim 14 wherein said handle comprises a frame having upper and lower bows spanned by a pair of elongate side bows which are each bowed laterally inwardly between said upper and lower bows.

16. The shovel set forth in claim 15 wherein said means mounting said blade on said frame includes means mounting said blade on said lower bow.

17. The shovel set forth in claim 14 wherein said handle comprises
a one-piece hollow frame having an upper handle bow and a pair of elongate side bows including
upper ends integrally coupled to opposite ends of said handle bow;
lower ends coupled to said blade; and
intermediate, laterally inwardly bowed side frame portions between said upper and lower ends.

18. A tool comprising:

a tool head;
an elongate tool handle having
an upper hand grip end and
a lower blade mounting end; and
means mounting said tool head on said lower blade mounting end;
said handle comprising
at least four substantially straight handle portions serially coupled together between said upper hand grip end and said lower blade mounting end;
adjacent ones of said handle portions being obliquely inclined relative to each other;
alternate ones of said handle portions lying in planes which are parallel to each other.

19. The tool set forth in claim 18 wherein adjacent ones of said handle portions lie in planes which are obliquely inclined relative to each other at an angle substantially equal to 22°.

20. A tool handle for attachment to a tool head, such as a shovel blade or the like, said tool handle comprising
an upper handle end;
a lower tool end for mounting a tool head;
at least four substantially straight handle portions serially coupled together between said upper and lower ends;
adjacent ones of said handle portions lying in planes which are obliquely inclined relative to each other; and
alternate ones of said handle portions lying in planes which are parallel to each other.

* * * * *